Figure 1:
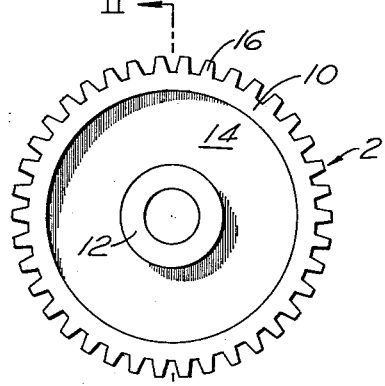

March 3, 1964 — J. J. VISSER — 3,122,938
ANTI-BACKLASH GEAR AND GEAR COMBINATION
Filed May 13, 1960 — 5 Sheets-Sheet 1

INVENTOR.
JACOB J. VISSER
BY
Ernest L. Brown
ATTORNEY

March 3, 1964          J. J. VISSER          3,122,938

ANTI-BACKLASH GEAR AND GEAR COMBINATION

Filed May 13, 1960          5 Sheets-Sheet 2

INVENTOR.
JACOB J. VISSER
BY
Ernest L. Brown
ATTORNEY

INVENTOR.
JACOB J. VISSER
BY
Ernest L. Brown
ATTORNEY

March 3, 1964     J. J. VISSER     3,122,938
ANTI-BACKLASH GEAR AND GEAR COMBINATION
Filed May 13, 1960     5 Sheets-Sheet 4

*INVENTOR.*
JACOB J. VISSER
BY *Ernest L. Brown*
ATTORNEY

March 3, 1964 J. J. VISSER 3,122,938
ANTI-BACKLASH GEAR AND GEAR COMBINATION
Filed May 13, 1960 5 Sheets-Sheet 5
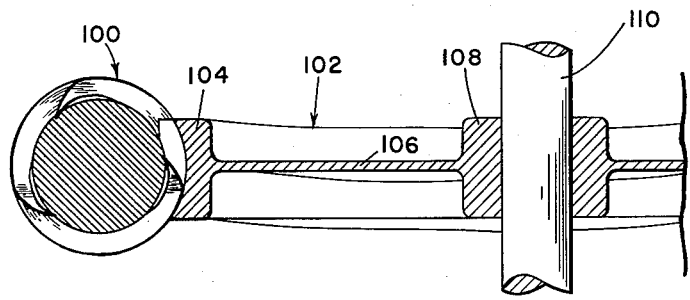
FIG. 13
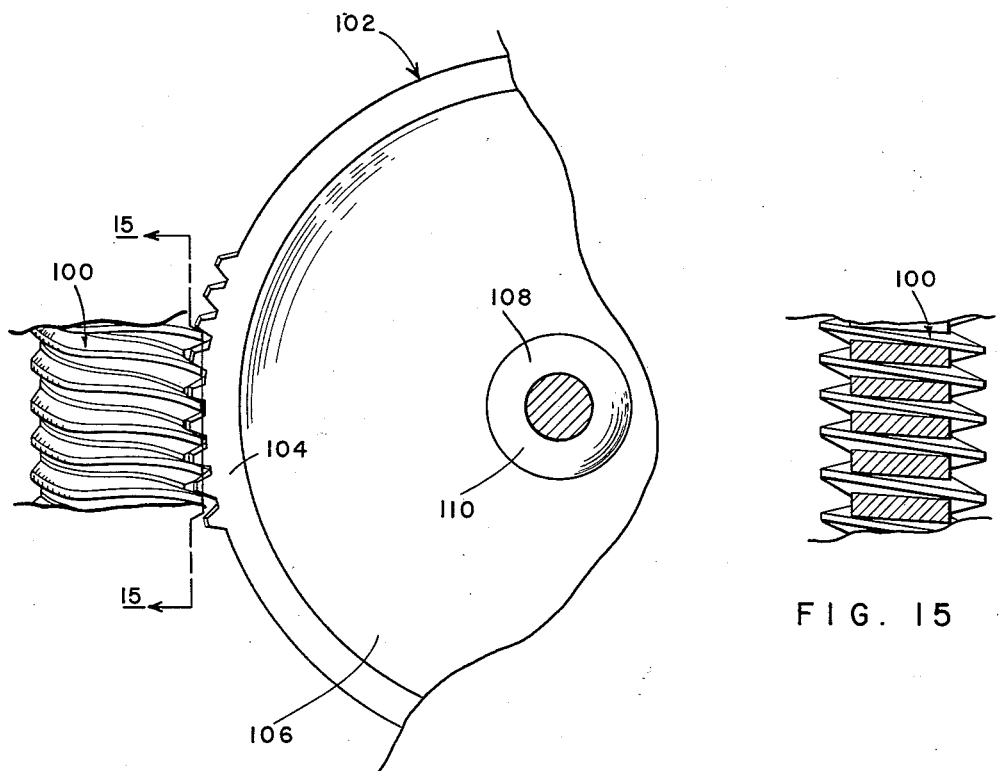
FIG. 14
FIG. 15
INVENTOR.
JACOB J. VISSER
BY Ernest L. Brown
ATTORNEY

United States Patent Office 3,122,938
Patented Mar. 3, 1964

3,122,938
ANTI-BACKLASH GEAR AND GEAR
COMBINATION
Jacob J. Visser, Grand Rapids, Mich., assignor to Lear Siegler, Inc., Santa Monica, Calif., a corporation of Delaware
Filed May 13, 1960, Ser. No. 30,397
24 Claims. (Cl. 74—409)

This invention pertains to an anti-backlash gear combination, and more particularly to a gear combination which utilizes a gear with a particular novel construction.

This is a continuation in part of patent application, Serial No. 820,028, filed June 12, 1959, now abandoned, by Jacob J. Visser, for an "Anti-Backlash Gear and Gear Combination."

In instrument gears, and the like, where precision shaft rotation is of prime importance and where the torques carried by the gears are relatively small, backlash in the gears causes unwanted errors to appear in the shaft's rotation. Various kinds of anti-backlash gears which utilize counter-rotating, spring loaded gears such as that in Patent No. 2,845,809 for "Pre-Loaded Gear" to G. F. Hetzel, or which utilize individually deformable teeth such as those in Patent No. 2,764,034 for "Antibacklash Gear System" to W. Hotine, are old in the instrument art. However, such devices do not achieve the desired accuracy. The fact that there are a large number of different kinds of so-called anti-backlash gears on the market is a monument to the fact that the problem has not been, heretofore, adequately solved.

It is, therefore, an object of this invention to provide a novel combination of gears which are utilized to reduce backlash.

It is another object of this invention to provide a novel gear structure which is adapted to reduce backlash.

It is a more particular object of this invention to provide a novel anti-backlash gear which has a rigid hub, a rigid rim, rigid teeth and an elastic web which is adapted to spring load an interference fit between the teeth of a helical gear and a spur gear.

It is also a more particular object of this invention to provide a novel anti-backlash gear which has a rigid hub, a rigid rim, rigid teeth and an elastic web which is adapted to spring load an interference fit between the teeth of a pair of helical gears.

It is also an object of this invention to provide a novel anti-backlash gear which is adapted to be utilized with a worm gear, and which has a rigid hub, a rigid rim, rigid teeth and an elastic web which is adapted to spring load an interference fit between the teeth of a helical gear and a worm or between the teeth of a spur gear and a worm.

Figure 2:
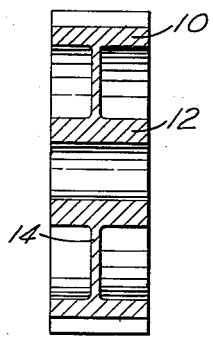
Figure 3:
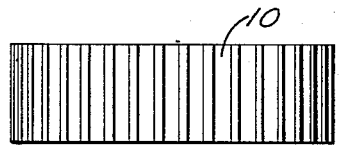
Figure 4:
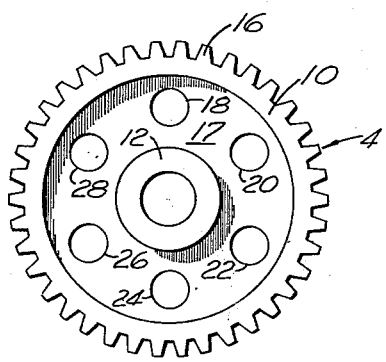
Figure 5:
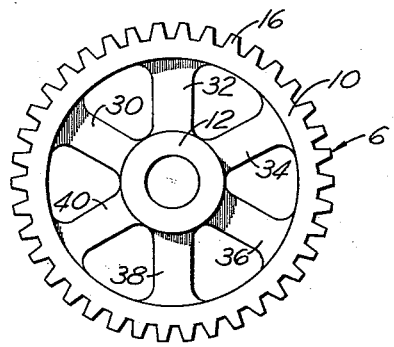
Figure 6:
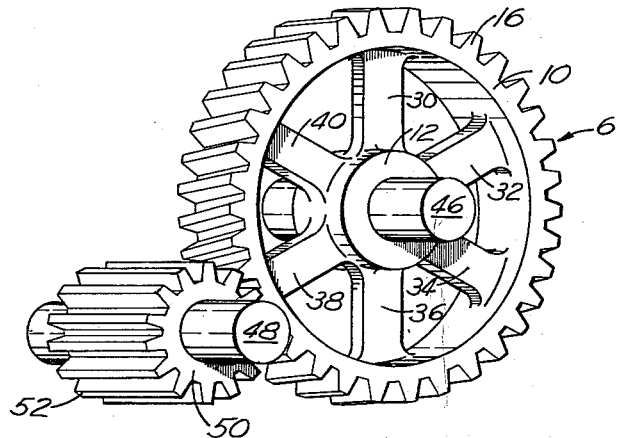
Figure 7:
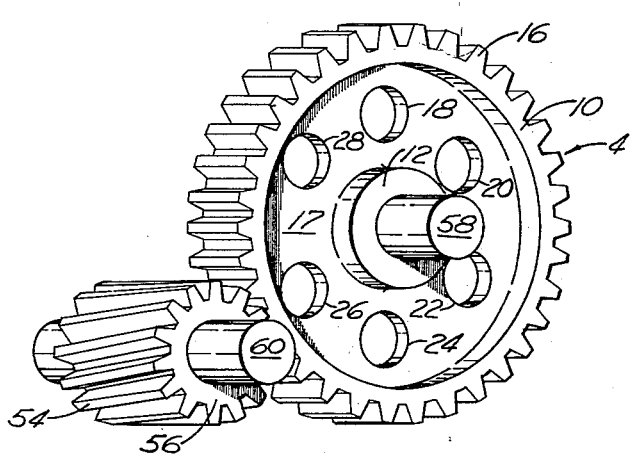
Figure 8:
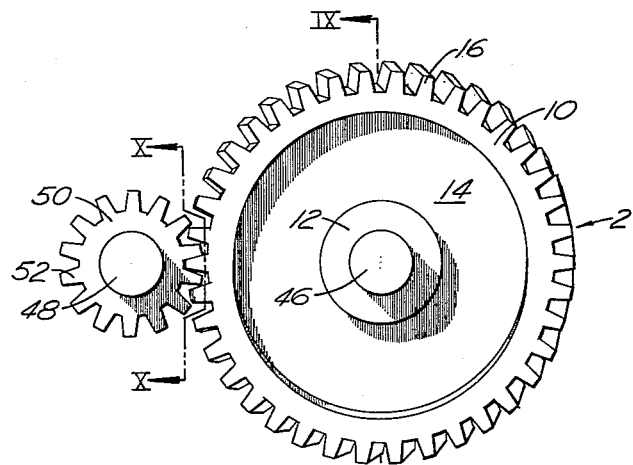
Figure 9:
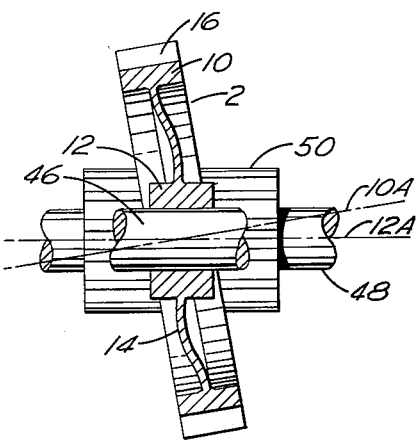
Figure 10:
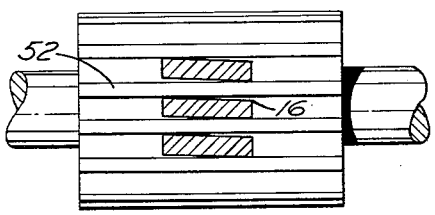
Figure 11:
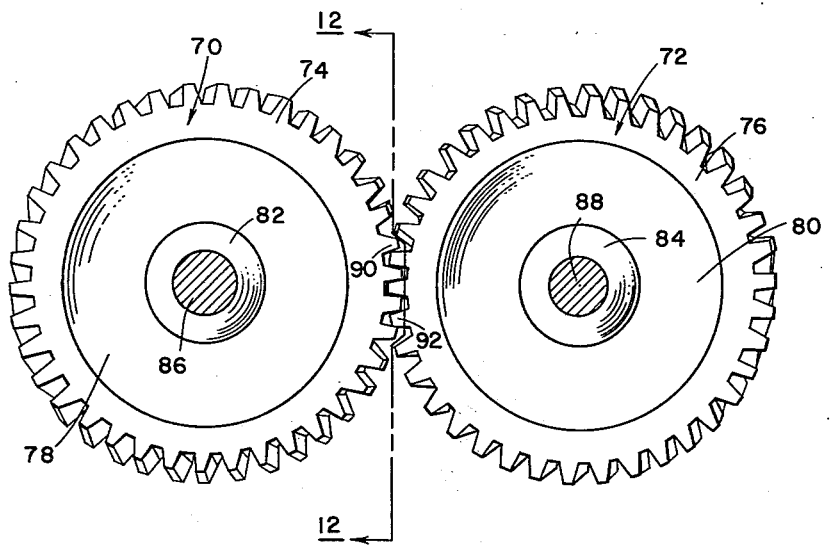
Figure 12:
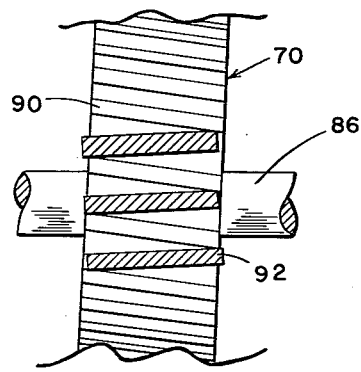

Other objects will become apparent from the following description when taken in connection with the accompanying drawings, in which:

FIG. 1 is a view of a typical gear with a flexible diaphragm web;
FIG. 2 is a view taken at II—II in FIG. 1;
FIG. 3 is a side view of the gear of FIG. 1;
FIG. 4 is an alternative embodiment of a flexible web utilizing a perforated diaphragm;
FIG. 5 is a second alternative embodiment of a gear with a flexible web utilizing flexible spokes;
FIG. 6 is a view of a typical anti-backlash gear combination of this invention utilizing a helical gear with a flexible web, meshed with a spur gear;
FIG. 7 is an alternative embodiment of the gear combination of this invention utilizing a spur gear with a flexible web, meshed with a helical gear;
FIG. 8 is a view of a typical gear combination of this invention with the displacement of the gears shown in exaggerated profile;
FIG. 9 is a view taken at IX—IX in FIG. 8;
FIG. 10 is a view taken at X—X in FIG. 8;
FIG. 11 is a view, similar to FIG. 8, of a typical gear combination of this invention showing a pair of helical gears in mesh;
FIG. 12 is a view taken at 12—12 in FIG. 11;
FIG. 13 is an end view of a worm mating with a gear of this invention;
FIG. 14 is a view from the top of FIG. 13; and
FIG. 15 is a view taken at 15—15 in FIG. 14.

The anti-backlash gear combination of this invention is a pair of meshed gears, one of said gears having a flexible web with a rigid rim, a rigid hub, and rigid teeth. The various kinds of flexible webs which are specifically claimed in this patent are shown more particularly in FIGS. 1, 2, 4 and 5. It is to be noted, however, that other flexible webs are claimed by the broad claims and that the invention is not limited to the shown embodiments.

In FIGS. 1, 2 and 3, rim 10, hub 12 and teeth 16 are rigid. Web 14 is a flexible diaphragm of relatively thin material which is adapted to be flexed to cause the gear teeth 16 to mesh with a helical gear. It is to be stressed (as explained hereinafter) that gear teeth 16 may be (alternatively) helical gear teeth which are adapted to mesh with a spur gear.

When it is stated herein that the web of a gear is flexible while the hub, rim and teeth are rigid, it is to be understood that what is meant is that the hub, rim, and teeth are relatively rigid in that their deformation is insignificant compared to the deformation of the web. That is (for example), the entire gear may be made of beryllium-copper with a thin web 14 and a relatively rigid rim 10, hub 12 and teeth 16. It is obvious that beryllium-copper is elastic in the scientific meaning of the word in that beryllium-copper has, within limits, an essentially linear stress strain relation. Thus all parts would deform slightly under load. However, for the purposes of this invention, it is essential that the deformation of rim 10, teeth 16 and hub 12 be insignificant compared to the deformation of web 14.

In FIG. 4, an alternative embodiment is shown which utilizes a flexible web 17 which has at least one hole 18 perforated therein. A plurality of holes are shown in FIG. 4 and would usually be found in an embodiment of this type. With a perforated diaphragm, holes 18, 20, 22, 24, 26 and 28 would usually be symmetrically arranged around the axis of rotation at a uniform radius from said axis in order to provide a symmetrical gear. Again, it is to be stressed that hub 12, rim 10 and teeth 16 are rigid relative to web 17. That is, hub 12, rim 10 and teeth 16 have an insignificant deformation compared to the deformation of flexible perforated diaphragm 17.

In FIG. 5, still another alternative embodiment of a gear with a relatively rigid hub 12, rim 10 and teeth 16 is shown with flexible spokes, such as that shown at 30. It is usual that there will be more than one flexible spoke in order to assure symmetry of the gear. For example, in FIG. 5, spokes 30, 32, 34, 36, 38 and 40 are symmetrically disposed about the axis of rotation of the gear. Just as in the embodiment of FIGS. 1 and 4, it is to be understood that the displacement characteristics of rim 10, hub 12 and teeth 16 are insignificant compared to the displacement characteristics of the web of spokes 30, 32, 34, 36, 38 and 40.

It should again be pointed out that the teeth on the gears of FIGS. 4 and 5 may be either spur gear teeth or helical gear teeth. If the teeth 16 are spur gear teeth, they are adapted to mesh with helical gear teeth. If teeth 16 are helical gear teeth, they are adapted to mesh with a spur gear.

In FIG. 6, gear 6 is positioned upon shaft 46 and gear 50 is positioned upon shaft 48, the axis of which is parallel to the axis of shaft 46. Any one of the three alternative embodiments shown in FIGS. 1, 4 and 5, or any other embodiment of the gear portion of this invention which has a rigid hub, rim and teeth with a flexible web may be substituted for gear 6. In FIG. 6, the teeth 16 on gear 6 are shown to be helical, while the teeth 52 which mesh with teeth 16 are seen to be of the spur gear type. Shafts 46 and 48 are parallel so that, in order for the helical teeth 16 to mesh with spur teeth 52, it is necessary that the web of gear 6 be deformed in a fashion to be explained more specifically in connection with FIGS. 8 and 9.

FIG. 7 shows the alternative embodiment of the anti-backlash gear combination of this invention with spur gear teeth 16 on gear 4 and helical gear teeth 54 on gear 56. Gear 4 is connected to rotate about shaft 58, the gear 56 is mounted to rotate about shaft 60, the axis of which is parallel to the axis of shaft 58. Any of the flexible webs heretofore described or other flexible webs may be substituted for web 17. When gear 56 meshes with gear 4, therefore, it is necessary that the web 17 of gear 4 deform in a manner to be described hereinafter.

FIGURES 8 and 9 show a helical gear 2 with a rigid hub 12, rim 10 and teeth 16 in mesh with spur gear 50. Gears 2 and 50 are mounted upon parallel shafts 46 and 48 whose axes are parallel, as designated by axis 12A in FIG. 9.

The meshing of teeth 16 with teeth 52 causes rim 10 to be tilted so that its axis 10A forms an angle relative to axis 12A, as shown in FIG. 9.

The meshing of the gear teeth to form an interference fit is shown in FIG. 10. The circumferential distance from end to end of an individual tooth 16 is slightly greater than the tooth-to-tooth spacing between the teeth 52. That is, the circumferential distance about gear 2 (FIGS. 8 or 9), as determined by parallel lines extending axially from (a) the upper left hand corner and (b) the lower right hand corner, of an individual tooth 16 (FIG. 10), is greater than the distance between two successive teeth 52. When the teeth 16 and 52 mesh, the elastic web 14 deforms as shown in FIG. 9. Teeth 16 and 52 are maintained in contact by the spring loading of flexible diaphragm 14. FIG. 12 shows another example of an interference fit wherein the circumferential distance from end to end of an individual tooth of one gear is slightly greater than the tooth-to-tooth spacing in a meshing gear which is available to accommodate said individual tooth. Here, the web of either one or both of the meshing gears must flex as the gears mesh. Thus backlash is minimized or eliminated.

FIGURES 11 and 12 show a pair of mating helical gears 70 and 72 which have rigid rims 74 and 76, elastic webs 78 and 80, and rigid hubs 82 and 84. Hubs 82 and 84 are mounted upon parallel shafts 86 and 88. The helix angle of gears 70 and 72 are directed in opposite directions (as shown more particularly in FIGURE 12) to form an interference fit between the teeth of gear 70 (one of which is shown at 90) and the teeth of gear 72 (one of which is shown at 92).

FIGURES 13, 14 and 15 show a worm 100 meshing with a gear 102. Gear 102 has a rigid rim 104, an elastic web 106, and a rigid hub 108. Gear 102 is positioned upon shaft 110. The helix angle of worm 100 and the helix angle of gear 102 do not match, whereby the teeth of gear 102 are wedged by an interference fit into the worm 100. Web 106 oilcans to keep the axis of shaft 110 normal to the axis of worm 100.

In operation, as the gears rotate, the flexible web stretches and contracts to maintain an anti-backlash bias on the gear teeth.

There has thus been provided hereby a novel anti-backlash gear and gear combination whose backlash (by actual test) is approximately one-third that of its best competitor. It is expected that by careful design, this factor may be decreased still more.

It is not intended that the gear and gear combination of this invention is to be limited by the above description to the specific embodiments shown, but only in accordance with the following claims.

I claim:

1. An anti-backlash gear combination comprising: a first gear; a second gear mounted so as to mesh with said first gear; at least one of said gears being of unitary construction and having a rigid hub, a rigid rim, rigid teeth and an axially flexible web; said web being adapted to spring load an interference fit between the teeth of said gears, whereby a line coaxial with the axis of said hub of said gear having said axially flexible web, forms an angle with an intersecting line taken normal to the plane in which said rim lies upon deflection of said rim relative to said hub in order to achieve said interference fit.

2. A combination as recited in claim 1 in which said flexible web is an elastic diaphragm.

3. A combination as recited in claim 1 in which said flexible web is an elastic diaphragm which is relieved by at least one hole perforated therein.

4. A combination as recited in claim 1 in which said flexible web comprises elastic spokes.

5. An anti-backlash gear combination comprising: a spur gear; a helical gear mounted so as to mesh with said spur gear; at least one of said gears being of unitary construction and having a rigid hub, a rigid rim, rigid teeth, and an axially flexible web; said web being adapted to spring load an interference fit between the teeth of said gears, whereby a line coaxial with the axis of said hub of said gear having said axially flexible web, forms an angle with an intersecting line taken normal to the plane in which said rim lies upon deflection of said rim relative to said hub in order to achieve said interference fit.

6. A combination as recited in claim 5 in which said flexible web is an elastic diaphragm.

7. A combination as recited in claim 5 in which said flexible web is an elastic diaphragm which is relieved by at least one hole perforated therein.

8. A combination as recited in claim 5 in which said flexible web comprises elastic spokes.

9. An anti-backlash gear combination comprising: a first gear; a second gear mounted so as to mesh with said first gear; at least one of said gears having a rigid hub, a rigid rim, rigid teeth and an axially flexible web; said web being adapted to spring load an interference fit between the teeth of said gears wherein the circumferential distance from end to end of an individual tooth of one said gear is slightly greater than the tooth to tooth spacing between the teeth of the other said gear to cause the rim of said gear having said axially flexible web to deflect into an angle relative to the axis of its hub.

10. A combination as recited in claim 9 wherein said flexible web is an elastic diaphragm.

11. A combination as recited in claim 9 in which said flexible web is an elastic diaphragm which is relieved by at least one hole perforated therein.

12. A combination as recited in claim 9 in which said flexible web comprises elastic spokes.

13. An anti-backlash gear combination comprising: a first gear and a second gear mounted so as to mesh with said first gear wherein at least one of said gears is a helical gear, and wherein at least one of said gears has a rigid hub, a rigid rim, rigid teeth, and an axially flexible web; said web being adapted to spring load an interference fit between the teeth of said gears wherein the circumferential distance from end to end of an individual tooth of one said gear is slightly greater than the tooth to tooth spacing between the teeth of the other said gear to cause the rim of said gear having said axially flexible web to deflect so that a line coaxial with the axis of the hub of said gear having said flexible web forms an angle with a line drawn normal to the plane in which the deflected rim of said flexible gear lies.

14. A combination as recited in claim 13 wherein said flexible web is an elastic diaphragm.

15. A combination as recited in claim 13 in which said flexible web is an elastic diaphragm which is relieved by at least one hole perforated therein.

16. A combination as recited in claim 13 in which said flexible web comprises elastic spokes.

17. An anti-backlash gear combination comprising: a spur gear; a helical gear mounted so as to mesh with said spur gear; at least one of said gears having a rigid hub, a rigid rim, rigid teeth, and an axially flexible web; said web being adapted to spring load an interference fit between the teeth of said gears, wherein the circumferential distance from end to end of one said gear is slightly greater than the tooth to tooth spacing between the teeth of other said gear to cause the rim of said flexible gear to deflect so that a line coaxial with the axis of the hub of said gear having said flexible web forms an angle with a line drawn normal to the plane in which the deflected rim of said flexible gear lies.

18. A combination as recited in claim 17 wherein said flexible web is an elastic diaphragm.

19. A combination as recited in claim 17 in which said flexible web is an elastic diaphragm which is relieved by at least one hole perforated therein.

20. A combination as recited in claim 17 in which said flexible web comprises elastic spokes.

21. A gear of unitary construction having a rigid hub, a rigid rim, rigid teeth and a flexible web adapted to provide angular deflection of said rim relative to said hub whereby a line coaxial with the axis of said hub of said gear forms an angle with an intersecting line taken normal to the plane in which said rim lies upon deflection of said rim relative to said hub.

22. The gear of claim 21 wherein said flexible web is an elastic diaphragm.

23. The gear of claim 21 wherein said flexible web is an elastic diaphragm having at least one hole therein.

24. The gear of claim 21 wherein said web is comprised of elastic spokes.

References Cited in the file of this patent
UNITED STATES PATENTS

| | | |
|---|---|---|
| 249,752 | Gilliland | Nov. 22, 1881 |
| 888,634 | Morgan | May 26, 1908 |
| 1,792,049 | Treschow | Feb. 10, 1931 |
| 2,207,290 | Hale | July 9, 1940 |
| 2,380,776 | Miller | July 31, 1945 |
| 2,764,034 | Hotine | Sept. 25, 1956 |
| 2,842,976 | Young | July 15, 1958 |
| 3,011,393 | Kotte | Dec. 5, 1961 |